(12) United States Patent
Dang et al.

(10) Patent No.: US 7,383,021 B2
(45) Date of Patent: Jun. 3, 2008

(54) METHOD AND APPARATUS FOR TRANSMITTING IN A COMMUNICATION DEVICE

(75) Inventors: Hiep T. Dang, Coconut Creek, FL (US); Branko L. Avanic, Miami, FL (US); John K. McKinney, Miramar, FL (US); Joseph J. Medvid, III, Weston, FL (US); Wayne M. Phang, Coral Springs, FL (US); Kevin D. Walkup, Miramar, FL (US)

(73) Assignee: Motorola, Inc., Schaumburg, IL (US)

( * ) Notice: Subject to any disclaimer, the term of this patent is extended or adjusted under 35 U.S.C. 154(b) by 585 days.

(21) Appl. No.: 10/900,535

(22) Filed: Jul. 28, 2004

(65) Prior Publication Data

US 2006/0025166 A1  Feb. 2, 2006

(51) Int. Cl.
*H04B 1/38* (2006.01)
*H04B 7/00* (2006.01)
*H04Q 7/20* (2006.01)

(52) U.S. Cl. .................... 455/50.1; 455/90.2; 455/517; 455/518

(58) Field of Classification Search ............... 455/90.2, 455/517, 518
See application file for complete search history.

(56) References Cited

U.S. PATENT DOCUMENTS

| | | | | |
|---|---|---|---|---|
| 5,923,735 A | * | 7/1999 | Swartz et al. | 379/93.12 |
| 5,992,750 A | * | 11/1999 | Chadima et al. | 235/472.01 |
| 6,234,395 B1 | * | 5/2001 | Chadima et al. | 235/472.01 |
| 6,377,249 B1 | * | 4/2002 | Mumford | 345/179 |
| 6,793,043 B2 | * | 9/2004 | Nguyen | 186/59 |

* cited by examiner

*Primary Examiner*—Lana N. Le
*Assistant Examiner*—Bobbak Safaipour
(74) *Attorney, Agent, or Firm*—Barbara R. Doutre

(57) ABSTRACT

A technique for activating a transmit mode of a communication device (100) is provided encompassing the steps of generating a light signal on an outer surface of the communication device; inhibiting the light signal; and activating the transmit mode of the communication device in response to the light signal being inhibited. A communication device (100) operating in accordance with this technique includes a light transmitting device (108); and a sensor (110) for sensing light generated by the light transmitting device, the sensor disabling a transmit mode when light is detected and enabling a transmit mode when light is inhibited.

6 Claims, 2 Drawing Sheets

METHOD AND APPARATUS FOR TRANSMITTING IN A COMMUNICATION DEVICE

TECHNICAL FIELD

This invention relates in general to simplex communication devices and more particularly to user interfaces for transmitting from such devices.

BACKGROUND

A dispatch communication system provides simplex communication in which one member of a group may talk to all the other members of the group in a broadcast fashion. Examples of dispatch communication systems include but are not limited to: taxi systems, police communication systems and the "iDEN" communication system sold by "MOTOROLA" which combines both cellular and dispatch capability. Dispatch systems may encompass portable, mobile and/or stationary communication units, each unit having a push-to-talk (PTT) button. To talk to the rest of the group, a user depresses the PTT button on his or her communication unit and continues depressing the PTT button while speaking. When finished or to allow another user of the group to speak, the user releases the PTT button. Another user may then speak by depressing his or her PTT button.

Depression of the PTT signals a host processor to key up the communication device. Typical PTT assemblies are formed of a switch, such as a popple switch, which is provided to the interior of the communication device housing and can be actuated by depressing a PTT lever mounted on the outside of the housing. Standard PTT switch assemblies are plagued with alignment problems. Alignment problems are created by large tolerance stack-ups between the actuation lever and the interior popple switch. In some cases, improper alignment of the lever will prevent the switch from being activated. Another problem encountered with the alignment variation is that the force needed to actuate the switch will vary between devices. This varying force may leave the user questioning if the switch was actuated when the lever is depressed. A constant pressure on the PTT lever is required at all times during the transmission. Trying to maintain this constant pressure can lead to finger fatigue in the user. Elderly, physically impaired or inexperienced users who are not familiar with PTT features sometimes lose communication, because they are unable to maintain constant pressure on the PTT switch.

Accordingly, there is a need for an improved user interface for transmitting on a simplex communication device.

BRIEF DESCRIPTION OF THE DRAWINGS

The features of the present invention, which are believed to be novel, are set forth with particularly in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
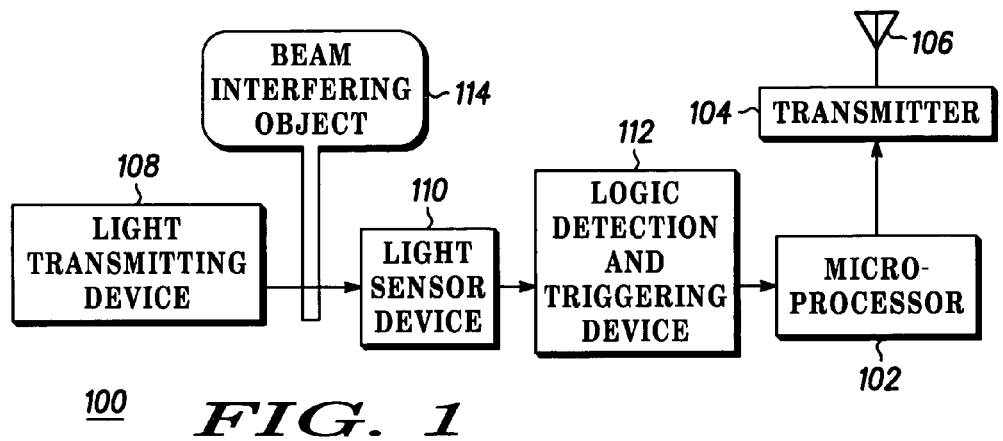
FIG. 1 is a partial block diagram of a communication device incorporating a user interface formed in accordance with the present invention.

While the specification concludes with claims defining the features of the invention that are regarded as novel, it is believed that the invention will be better understood from a consideration of the following description in conjunction with the drawing figures, in which like reference numerals are carried forward.

In accordance with the present invention, there is disclosed herein a technique for activating a transmit mode of a communication device. Briefly, the technique encompasses the steps of generating a light signal on an outer surface of the communication device; inhibiting the light signal; and activating the transmit mode of the communication device in response to the light signal being inhibited. A communication device operating in accordance with this technique includes a light transmitting device; and a sensor for sensing light generated by the light transmitting device, the sensor disabling a transmit mode when light is detected and enabling a transmit mode when light is not detected.

FIG. 1 shows a partial block diagram of a communication device incorporating a user interface formed in accordance with the present invention. Communication device 100 may be a portable or mobile two-way radio, cell phone or other communication device having dispatch capability or a stand-alone transmitting device. Communication device 100 includes a microprocessor 102, a transmitter 104 and an antenna 106. In accordance with the present invention, communication device 100 further includes a light transmitting device 108, light sensor device 110 and logic detection circuitry 112. In accordance with the present invention, the light transmitting device 108 and light sensor device 110 provide a user interface which replaces the conventional push-to-talk interface.

The light transmitting device 108 may comprise for example, a light emitting diode (LED) or similar device, while the light sensor device 110 may comprise a photo diode, photo transistor or similar device. In accordance with the present invention, the light transmitting device 108 and sensing device 110 provide a user interface for activating/deactivating audio transmissions for the communication device 100.

The user interface of the present invention minimizes finger fatigue by eliminating the need for continuous finger pressure by the user. During a no-talk period, a constant beam of light is generated by the light transmitting device 108, thereby providing a beam of light to a surface of the communication device. The beam of light is aligned with the light sensor device 110 so as to set a "no-talk" logic level to the microprocessor 102 via logic detection circuitry 112. During a talk period, the user uses his or her finger or other light interfering device 114 to block or break the beam of light from being sensed by the sensor 110. The logic circuitry 112 detects the change in the sensor and triggers a "talk" logic level to the microprocessor 102. The microprocessor responds by enabling the transmitter 104 into a transmit mode of operation. Upon completion of the conversation, the user removes the beam-breaking device (e.g.

finger) 114 in order to revert back to the "no-talk" state. In response to sensing the beam of light at sensor 110, the transmit mode is disabled.

Figure 2:
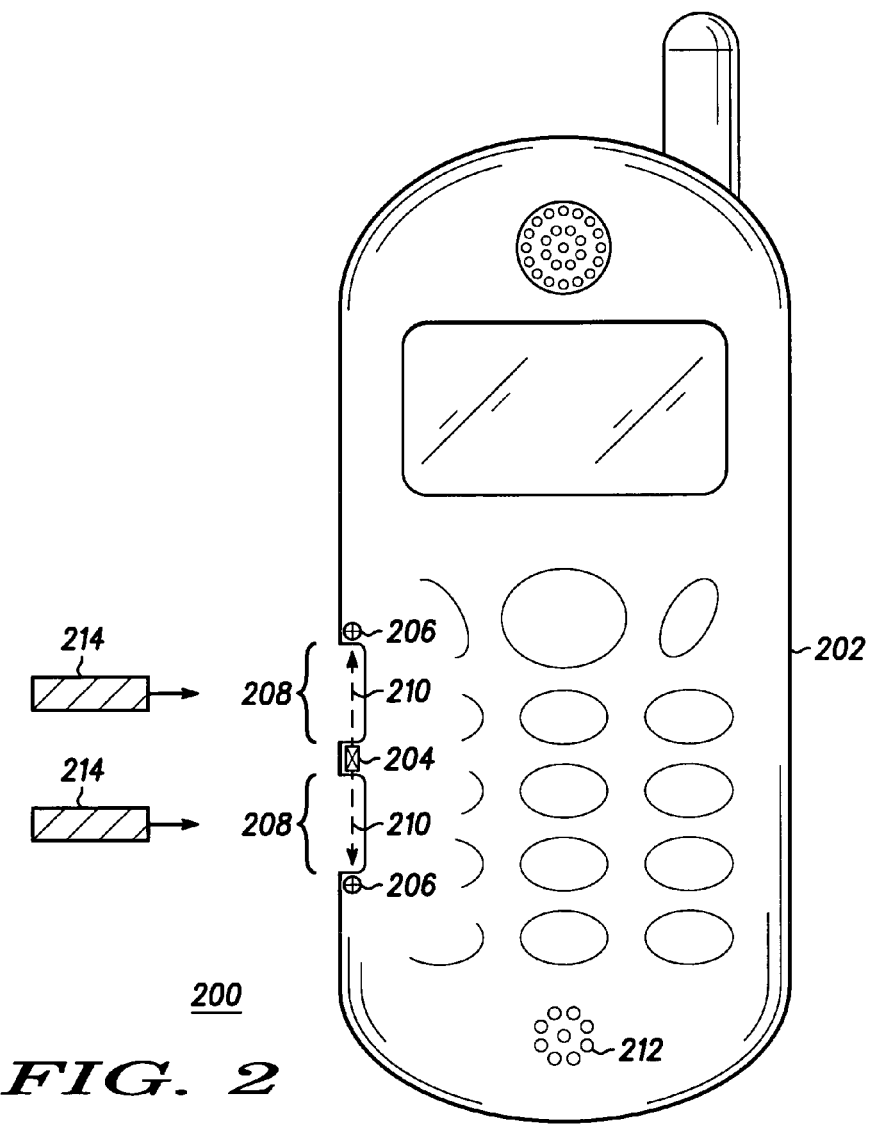
FIG. 2 is communication device including an example of a user interface formed in accordance with the present invention.

FIG. 2 is an example of a portable radio or cell phone 200 incorporating a user interface formed in accordance with an embodiment of the invention. Communication device 200 includes a housing 202, at least one light transmitting device 204 coupled to the housing and at least one light sensor 206 incorporated therein. In this illustration, the light transmitting device 204 comprises an LED coupled to the housing 202 between two recessed portions 208, each recessed portion including the light sensor(s) 206. In this example, the recessed portions 208 are configured to accommodate a user's fingers or some external light interfering device 214. A beam of light 210 is generated from the LED and sensed by sensors 206 to maintain a disabled transmit mode. Light beam 210 may be either a periodic or continuous light signal. To enable the transmit mode, the user simply places two his/her fingers or other light interfering device 214 within the recessed portions 208 to break the light beam 210. During the transmission, the user speaks into microphone 212. Once the user has finished speaking, the fingers or light interfering device 214 are removed to disable the transmit mode.

Additional light emitting devices and sensors can be used to enhance the beam-breaking feature to facilitate detection and minimize falsing. A variety of configurations can be used for the placement of the light transmitting device and sensor. However, the placement of the light transmitting device and sensor in recessed locations of the communication device, such as shown in FIG. 2, minimizes false activations and has the advantage of providing for "soft touch" activation. The recessed cavities provide good tactile feedback for the user so that they can easily become accustomed to the feel of the device, particularly useful in blind operation scenarios where the communication device is mounted on the user's belt.

Figure 3:
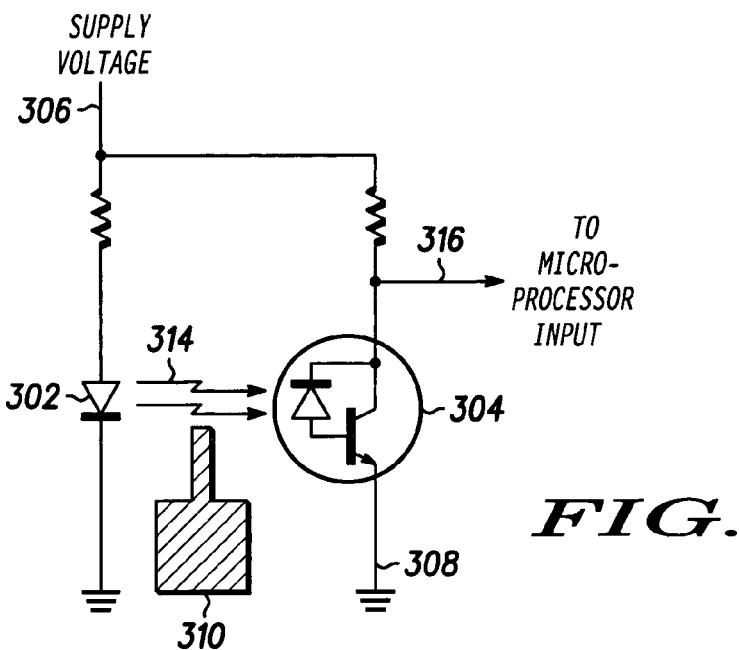
FIG. 3 is an example of a simplified electrical diagram for a beam-breaking detection circuit in accordance with an embodiment of the invention.
Figure 4:
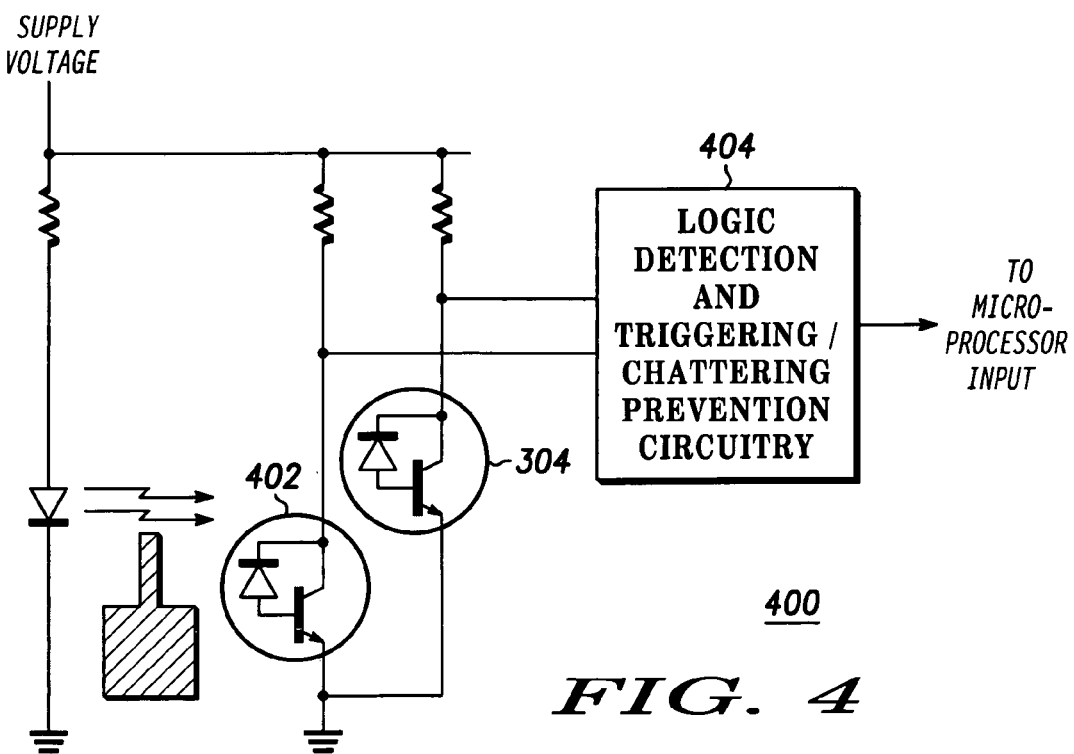
FIG. 4 is an example of a simplified electrical diagram for a beam-breaking detection circuit having false transmission protection in accordance with a further embodiment of the invention.

FIG. 3 is an example of a simplified electrical diagram for a beam-breaking detection circuit 300 that can be used for the user interface of the present invention. Detection circuit 300 includes LED 302, photo transistor 304 operatively biased between supply 306 and ground 308. As light interfering device 310 breaks light beam 314, signal level 316 changes to alter the input to the microprocessor. FIG. 4 is another example of a beam braking detection circuit 400 in accordance with an embodiment of the invention that incorporates false detection circuitry through the addition of a second photo transistor 402 and additional logic circuitry 404. As mentioned in conjunction with FIG. 2, multiple sensors can be used to help minimize false transmissions.

Accordingly, there has been provided a beam-breaking feature that provides an improved user interface by making it easier to activate and maintain simplex communication in dispatch devices or one-way stand-alone devices, such as call boxes. The beam-breaking feature of the present invention simplifies the mechanical design of communication devices since there is no need for a unique PTT button or switch.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A communication device, comprising:
   a housing;
   a transmitter located within the housing;
   a light emitting device generating a light signal onto a surface of the housing;
   a sensor for sensing the light signal;
   logic circuitry coupled to the sensor for detecting changes in the light signal, the logic circuitry generating a first logic level for a no-talk mode in response to the light signal and a second logic level for a talk mode in response to a break in the light signal; and
   a microprocessor responsive to the first and second logic levels, the microprocessor enabling the transmitter in response to the second logic level.

2. The communication device of claim 1, wherein the communication device is a portable two-way radio.

3. The communication of claim 1, wherein the communication device is a cellular phone having dispatch capability.

4. The communication device of claim 1, wherein the communication device is a dispatch communication device that provides simplex communication.

5. The communication device of claim 1, wherein the communication device is a stand-alone transmit device.

6. The communication device of claim 5, wherein the stand-alone transmit device comprises a call-box.

* * * * *